United States Patent Office 3,850,981
Patented Nov. 26, 1974

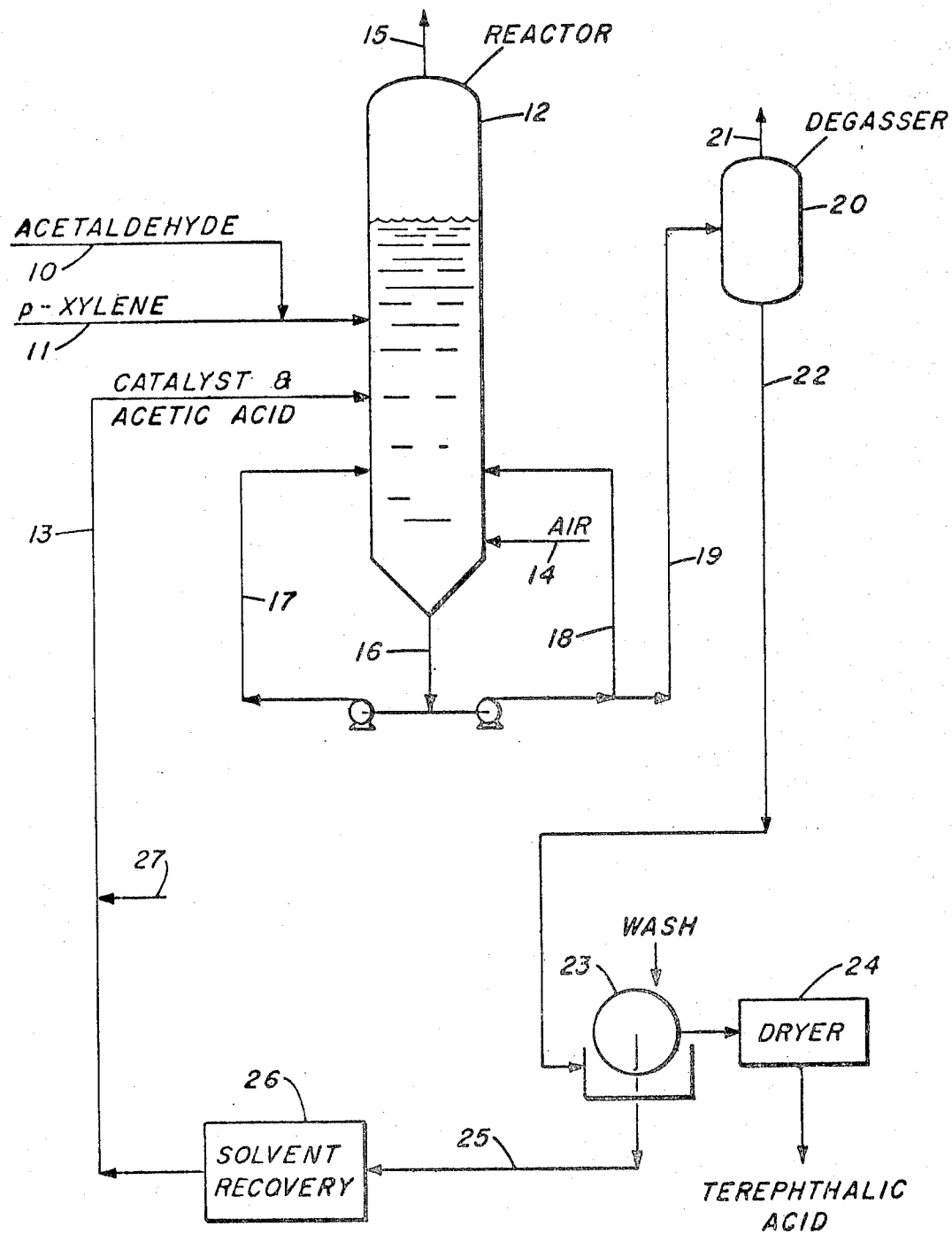

3,850,981
LIQUID PHASE OXIDATION OF p-XYLENE TO TEREPHTHALIC ACID
John C. Trebellas and Hubert H. Thigpen, Corpus Christi, Tex., and Wallace M. Mays, Novato, Calif., assignors to Celanese Corporation, New York, N.Y.
Continuation of abandoned application Ser. No. 721,704, Apr. 16, 1968. This application May 14, 1971, Ser. No. 143,604
Int. Cl. C07c 63/02
U.S. Cl. 260—524 R
17 Claims

ABSTRACT OF THE DISCLOSURE

A continuous process for the liquid phase oxidation of p-xylene or m-xylene to terephthalic acid or isophthalic acid in the presence of acetic acid solvent, cobalt catalyst and acetaldehyde co-oxidant, the process being conducted in a backmixed reactor such that the steady state concentration of the phthalic acid precursors are less than about 3% by weight of the slurry in the reactor and such that at least 98.6% of the xylene is converted to some other product. The temperature is maintained at from 120–140° C. and the pressure is maintained above 95 p.s.i.g. (above 400 p.s.i.g. when air is used). In the feed, the ratio of acetaldehyde to xylene is at least 0.2:1 and the ratio of acetic acid to xylene is from about 3:1 to 15:1.

This application is a streamlined continuation of Ser. No. 721,704 filed Apr. 16, 1968 and now abandoned.

Background of the Invention

The present invention relates to the production of terephthalic acid or isophthalic acid. More particularly the present invention relates to a process for the continuous production of terephthalic acid or isophthalic acid by the liquid phase oxidation of p-xylene or m-xylene.

It is known that p-xylene or m-xylene may be oxidized with an oxygen-containing gas to the corresponding benzene dicarboxylic acid, i.e. terephthalic or isophthalic acid, respectively, in the presence of an acetic acid solvent, an acetaldehyde co-oxidant, and a soluble cobalt salt catalyst. For example U.S. Pat. 2,245,528 and 2,673,217 disclose such processes, however, no relatively simple process is known which is capable of continuously producing a high purity phthalic acid from the aforementioned feed materials, U.S. Pat. 3,240,803 does disclose a continuous process for terephthalic acid production but that process requires relatively high amounts of acetaldehyde fed in a plurality of zonal increments if high purity terephthalic acid is to be produced. Also that process is limited to operation at from 2–10 atmospheres.

Summary

It is thus an object of the present invention to provide a continuous process for the production of terephthalic acid, isophthalic acid, or mixtures thereof by the liquid phase oxidation respectively of p-xylene, m-xylene, or mixtures thereof. It is also an object of the present invention to provide a continuous process for the production of relatively pure terephthalic or isophthalic acid which process is relatively simple in operation and is capable of producing a high purity acid in an single-stage reaction zone. Additional objects will become apparent from the following description of the present invention.

These and other objects are accomplished by the present invention which in one of its embodiments is a continuous process for the liquid phase oxidation of p-xylene or m-xylene to the corresponding benzene dicarboxylic acid comprising (a) continuously feeding m-xylene and/or p-xylene, acetaldehyde, an oxygen-containing gas, acetic acid, and a soluble cobalt salt catalyst to a reactor having a gas phase and a liquid-solid slurry phase, the amount of oxygen-containing gas being sufficient to provide at least 3.25 moles oxygen per mole of xylene, the weight ratio of acetaldehyde to xylene being at least 0.2:1, the weight ratio of acetic acid to xylene being from about 3:1 to 15:1 and the amount of catalyst being sufficient to provide about 0.1 to 2.5% cobalt metal based on the combined weight of xylene, acetic acid and acetaldehyde, (b) maintaining backmixing conditions in the liquid-solid slurry phase of said reactor, maintaining in said reactor a steady state concentration of aromatic benzene dicarboxylic acid precursors of less than 3% by weight of the liquid-solid slurry phase present, a temperature of from 120–140° C., a pressure of at least 95 p.s.i.g., and maintaining the average residence time of the reactants in the reactor such that at least 98.6% of the xylene fed is converted to some other product and, (c) continuously withdrawing from said reactor a portion of the liquid-solid slurry phase and a portion of the gaseous phase and recovering terephthalic acid from said portion withdrawn from liquid-solid slurry phase.

The drawing illustrates a specific embodiment of the present invention where p-xylene is oxidized to terephthalic acid.

Description of the Preferred Embodiments

As may be seen from the above summary the present continuous process is conducted in a reactor having both a gaseous phase and a liquid-solid slurry phase. Under the conditions of the process a liquid-solid slurry will necessarily be present in the reactor after steady state conditions are reached following startup. The finely divided solids present in the liquid-solid slurry will be mainly the insoluble benzene dicarboxylic acid product while the liquid will be mainly acetic acid. The acetic acid in the reactor is composed of that added as a solvent as well as that derived from the acetaldehyde co-oxidant which is almost 100% oxidized under the conditions of the present process, the steady state concentration of the acetaldehyde in the reactor being less than about 500 p.p.m. by weight of the liquid-solid slurry present. Regarding the acetaldehyde co-oxidant of the present invention, other co-oxidants such as methylethylketone and ethanol are known but these are not satisfactory in the present process. As was pointed out above, the liquid-solid slurry phase in the reactor must be backmixed in order to obtain the good results possible with the present invention and this backmixing may be provided in any suitable manner. A backmix flow reactor is one in which the contents of the reactor are vigorously agitated to approach perfect mixing so that conditions throughout the reactor are the same and equal to the conditions at the outlet. Thus the composition of the liquid-solid slurry at any point in the reactor should be substantially the same as the liquid-solid slurry which is withdrawn for the recovery of the insoluble acid product therefrom. The backmixing of the liquid-solid slurry in the reactor may be accomplished for example by providing paddles or other mechanical agitators within the reactor or it may be accomplished by the introduction of the various feed streams into the solid-liquid slurry at high velocities or by use of recirculating pumps to withdraw the slurry from one part of the reactor and discharge it at a high velocity into a different area of the reactor. When accomplishing the backmixing by the introduction of one of more fluid streams into the liquid-solid slurry, it is frequently desirable to introduce these tangentially so that a swirling motion is set up in the reactor.

In conjunction with carrying out the reaction under backmixing conditions other variables of the process must also be controlled within certain limits. Thus the ratios of reactants, catalysts, etc. fed to the reactor must be controlled. In general the weight ratio of acetic acid to xylene in the feed should be from about 3:1 to 15:1 and is preferably from about 5:1 to 10:1. Usually there will be some water mixed with the acetic acid (and perhaps with the other reactants also) fed to the reactor and this water is not harmful as long as it is present in small amounts. However, the amount of water fed to the reaction zone should constitute less than about 12% by weight based on the combined weight of the xylene, acetaldehyde and acetic acid fed. The weight ratio of acetaldehyde to xylene in the feed must be at least 0.2:1 and in generally will be from about 0.2:1 to 2:1. Even though the high ratios of acetaldehyde will provide a product of high purity, it is preferred to operate such that the weights ratio of acetaldehyde to xylene in the feed is from about 0.25:1 to 0.6:1. In introducing the xylene, acetaldehyde, and acetic acid to the reactor it is preferable that these be introduced as liquids and further that they be introduced beneath the surface of the liquid slurry in order to, among other things, aid in agitating the liquid-solid slurry. Since acetaldehyde has a normal boiling point of about 20.3° C. it will sometimes be necessary to maintain pressure on it in odrer to keep it liquid. This may also be true of the xylene and acetic acid feed streams if they are preheated to temperatures near or above their boiling point before being introduced into the reactor. The xylene, acetaldehyde, and acetic acid may each be added separately to the reactor or may be combined in various ways before being added to the reactor. It is generally advantageous to combine the acetaldehyde with either the p-xylene or the acetic acid in order to avoid vapor lock problems which occur when pumping pure acetaldehyde.

The theoretical amount of oxygen required to oxidize one mole of xylene to the corresponding benzene dicarboxylic acid (and 2 moles of water) is 3 moles $O_2$ while one-half mole $O_2$ is theoretically required for each mole of acetaldehyde oxidized. Therefore the oxygen-containing gas must be fed at a rate sufficient to provide at least about 3.25 moles oxygen per mole xylene in the feed and will generally be fed at a rate sufficient to provide at least 4 moles $O_2$ per mole xylene. Examples of gases suitable for furnishing the oxygen necessary in the reaction include air, oxygen enriched air and substantially pure oxygen itself with air being the preferred source of oxygen. The oxygen-containing gas should be introduced into the reactor below the surface of the liquid in order to maintain a suitable diffussion rate of oxygen. The oxygen-containing gas may be introduced through a single inlet, such as one located in the bottom of a reactor, or it might be introduced through a plurality of inlets such as through a sparger. A sparger is a line or lines projecting into a reactor below the liquid level and having a number of openings in the line such that the gas flowing therethrough can be discharged into the liquid. The use of a single oxygen inlet in the bottom of the reactor is most useful where the reactor has a relatively high liquid level and a relatively small cross-sectional area (such as an upright cylindrical reactor) while a sparger or a plurality of inlets is most often used when there is a relatively shallow liquid level and a relatively high cross-sectional area (such as a horizontally disposed cylindrical reactor vessel). For safety purposes it is desirable that the oxygen content of the gas phase in the reactor (and thus in the vent gas) not exceed 4 mole percent, which corresponds generally in the present process to about 4.5 weight percent. Preferably the oxygen concentration of the vent gas is less than about 3.6 mole percent or, on a weight basis, less than about 4 weight percent.

The amount of cobalt salt catalyst fed to the reactor should be sufficient to provide from about 0.1 to 2.5% cobalt metal based on the combined weight of xylene, acetic acid, and acetaldehyde fed to the reactor. In regard to the catalyst, it is noted that many patents relating to the oxidation of xylene such as U.S. 3,240,803 mention not only cobalt catalysts but also disclose that manganese catalsyts alone or combined with cobalt are suitable catalysts. However, applicants have found that satisfactory results cannot be obtained in the persent invention using such manganese-containing catalysts. Also some of the literature relating to the oxidation of p-xylene utilizing cobalt catalysts call for the presence of bromides but these bromides are undesired in the present process. The preferred cobalt salt catalyst is cobalt acetate tetrahydrate although practically any cobalt salt which is soluble in the liquid reaction medium under the reaction conditions may be used. Other examples of suitable cobalt salt catalyst include cobalt carbonate, cobalt hydroxide, cobalt oxide or any salt which forms the salt of the acetic acid being used as a solvent in the process. The cobalt salt catalyst may be introduced as a separate stream to the reaction zone but it is conveniently combined with the acetic acid solvent before being introduced into the reaction zone.

In the reaction zone itself certain conditions must be observed if good results are to be obtained. The temperature should generally be from about 120-140° C. and preferably from 125-135° C. The pressure utilized will generally be at least 95 p.s.i.g. and can be up to 1500 p.s.i.g. and higher if desired. The pressure utilized in a particular situation will depend mainly on the particular oxygen-containing gas being used. For example if a substantially pure oxygen feed gas is being utilized, a pressure of 95 p.i.i.g. may be used. However for feed gases containing less than about 100% oxygen the required minimum pressure increases as the percent oxygen in the feed gas decreases. Thus for air, which is the preferred oxygen-containing gas of the present invention, the pressure must be at least 400 p.s.i.g. and should be within the range of 440 p.s.i.g. to 800 p.s.i.g. for best results. Applicants have found that the pressure must be at least this high in the present process in order to prevent the reactions from being oxygen diffusion rate limited.

In addition to maintaining the temperature and pressure within the proper limits, it has been found that the steady state concentration of the aromatic benzene dicarboxylic acid precursors in the reaction zone must be kept below 3% by weight based on the weight of the liquid-solid slurry present in the reaction zone. Higher steady state concentrations will result in a lowering product purity. By "aromatic benzene dicarboxylic acid precursors" is meant aromatic compounds which may be oxidized to the benzene dicarboxylic acid or acids being produced. In the situation where p-xylene is being oxidized to terephthalic acid, these precursors will be comprised mainly of p-xylene and the intermediates in the oxidation of p-xylene to terephthalic acid such as p-tolualdehyde, p-toluic acid, terephthalaldehyde, and 4-carboxybenzaldehyde. Of course where m-xylene is being oxidized, the precursors will be the *meta*-form of these foregoing compounds, i.e. m-xylene, m-toluic acid, and the like. When operating the present invention in preferred manner, the concentration of aromatic benzene dicarboxylic acid precursors will be from about 0.3% to 1%. In order to maintain the desired steady state concentration of acid precursors, the ratio of acetaldehyde co-oxidant to xylene in the feed may be increased or decreased as necessary. Increasing the ratio of acetaldehyde/xylene fed to the reactor causes the steady state concentration of the aromatic benzene dicarboxylic acid precursors to decrease and vice versa.

In addition to the foregoing critical limitations, it has also been found that the average residence time of the reactants in the reaction zone must be such that at least 98.6% and preferably at least 99% of the xylene fed to the reactor is converted to some other product. This is easily determined by sampling the effluent of the reaction zone in order to ascertain the amount of xylene present.

The residence time may be adjusted to that desired by varying the feed rate and/or the reactor volume. The actual residence time needed to obtain the desired conversion of xylene will generally be from about 1 to 4 hours, but more often from about 1½ to 3 hours.

In order to illustrate a specific embodiment of the present invention, reference is made to the sole figure. Acetaldehyde flowing at about 16.7 pounds per hour through line 10 is mixed with 51.4 pounds per hour of p-xylene flowing through line 11 and the resulting mixture charged to liquid phase oxidaton reactor 12. Simultaneously with the feed of the p-xylene and acetaldehyde, a mixture of 500.1 pounds per hour of acetic acid, 11.7 pounds per hour water, and 6.2 pounds per hour cobalt acetate tetrahydrate catalyst is charged through line 13 and air at an average rate of about 62 cubic feet per minute (as measured at 0° C., 14.7 p.s.i.a.) is charged through line 14 at a point near the bottom of reactor 12. The actual feed rate of the air through line 14 at any one time is dependent on the oxygen content of the gas phase being vented through line 15 and which is maintained at about 3 mole percent oxygen or 3.3 weight percent.

Reactor 12 is an upright cylindrical-type reactor with a cone-shaped bottom and contains no internals. Backmixing in the liquid-solid slurry phase of the reactor is accomplished by discharging all feed streams below the liquid level as well as by withdrawal of a portion of liquid-solid slurry from the bottom of reactor 12 through line 16 and recirculation of most of this withdrawn slurry through lines 17 and 18. A portion of the withdrawn slurry is also removed through line 19 for recovery of the terephthalic acid product. Lines 17 and 18 discharge the recirculated liquid-solid slurry tangentially into reactor 12 below the liquid level so as to impart a swirling motion to the slurry in the reactor. The temperature and pressure in reactor 12 are maintained at about 130° C. and 500 p.s.i.g. The steady state concentration of aromatic terephthalic acid precursors in the liquid-solid slurry phase of reactor 12 is maintained at about 0.8% by weight and about 99% of the p-xylene and about 99.5% of the acetaldehyde fed to the reactor are converted to some other product. The steady state concentration of the acetaldehyde in the liquid-solid slurry phase of the reaction zone is about 100 ppm by weight. The 0.8% of terephthalic acid precursors consists of about 0.1% p-xylene, 0.6% p-toluic acid and 0.1% 4-carboxybenzaldehyde.

After an average residence time of about two hours, the portion of the liquid-solid slurry withdrawn through line 19 is passed through degasser 20 operating at about 110° C. and atmospheric pressure. The gas phase resulting from the lowering of pressure is vented through line 21 and consists mainly of acetic acid (0.06 wt. percent, 0.03 mole percent), nitrogen (92.4 wt. percent, 94.1 mole percent), carbon dioxide (3.8 wt. percent, 2.5 mole percent), oxygen (3.3 wt. percent, 3.0 mole percent), and carbon monoxide (0.4 wt. percent, 0.4 mole percent). The liquid-solid slurry phase is withdrawn from degasser 20 through line 22 and passed to rotary drum vacuum filter 23. The filter operates with at least 0.5 pounds acetic acid wash per pound terephthalic acid, the wash being at 70° C. The wet crystals of terephthalic acid recovered from the drum surface of filter 23 are conveyed to dryer 24 and the dry terephthalic acid product is recovered therefrom. The dry product is of about 99.5% purity, the principal impurity being 0.3% 4 - carboxybenzaldehyde.

The filtrate from filter 23 which comprises mainly acetic acid and water along with small portions of xylene and aromatic terephthalic acid precursors is sent through line 25 to solvent recovery area 26 where the xylene and most of the water are removed by distillation. Then the catalyst-containing acetic acid stream is recycled from solvent recovery area 26 through line 13 to reactor 12.

Makeup catalyst and/or acetic acid may be added through line 27 should the recycle not be sufficient to provide the desired amount of either catalyst or acetic acid to reactor 12, however, no acetic acid makeup should be required in the process since practically all of the acetaldehyde fed to reactor 12 is converted to acetic acid. Thus in most instances, all of the acetic acid sent to solvent recovery area 26 will not be recycled to reactor 12. Solvent recovery area 26 may contain equipment for recovery of the p-xylene so that it can be recycled to the reactor.

When the process is carried out such that there is no backmixing or such that the steady state concentration of aromatic terephthalic acid precursors in the reactor goes above about 3%, the purity of the product drops markedly. Likewise the conversion of less than about 98.6% of the p-xylene or use of acetaldehyde to xylene ratios of less than 0.2:1 markedly effects a decrease in the purity of the terephthalic product produced.

Although the above specific embodiment is for the production of terephthalic acid from p-xylene, similar results may be obtained when oxidizing m-xylene to isophthalic acid or when oxidizing mixtures of m-xylene and p-xylene to produce a mixture of terephthalic and isophthalic acids. It is also pointed out that while the present process is excellent for the production of terephthalic and/or isophthalic acid of high purity, the application of the process to the oxidation of o-xylene to phthalic acid does not produce a high purity product.

We claim:

1. A continuous process for the liquid phase oxidation of m-xylene or p-xylene to the corresponding benzene dicarboxylic acid comprising:
    (a) continuously feeding m-xylene and/or p-xylene, acetaldehyde, an oxygen-containing gas, acetic acid and a soluble cobalt salt catalyst to a reactor having a gas phase and a liquid-solid slurry phase, the amount of oxygen-containing gas being sufficient to provide at least 3.25 moles oxygen per mole of xylene, the weight ratio of acetaldehyde to xylene being at least 0.2:1, the weight ratio of acetic acid to xylene being from about 3:1 to 15:1 and the amount of catalyst being sufficient to provide about 0.1 to 2.5% cobalt metal based on the combined weight of xylene, acetic acid and acetaldehyde,
    (b) maintaining backmixing conditions in the liquid-solid slurry phase of said reactor, maintaining in said reactor a steady state concentration of aromatic benzene dicarboxylic acid precursors of less than 3% by weight of the liquid-solid slurry phase present, a temperature of from 120–140° C., a pressure of at least 95 p.s.i.g., and maintaining the average residence time of the reactants in the reactor such that at least 98.6% of the xylene fed is converted to some other product and
    (c) continuously withdrawing form said reactor a portion of the liquid-solid slurry phase and a portion of the gaseous phase and recovering terephthalic acid from said portion withdrawn from said liquid-solid slurry phase.

2. The process of Claim 1 wherein the steady state concentration of aromatic benzene dicarboxylic acid precursors is less than about 1% by weight of the liquid-solid slurry present in the reactor.

3. The process of Claim 1 wherein the ratio of acetaldehyde to xylene in the feed is from about 0.25:1 to 0.6:1.

4. The process of Claim 1 wherein the temperature in the reactor is from about 125–135° C.

5. The process of Claim 1 wherein the oxygen-containing gas is air and the pressure in the reactor is maintained at about 440 to 800 p.s.i.g.

6. The process of Claim 1 wherein at least 99% of the xylene fed to the reactor is converted to some other product.

7. The process of Claim 1 wherein the xylene fed to the reactor consists essentially of p-xylene.

8. The process of Claim 1 wherein the oxygen-containing gas is introduced into the reactor below the liquid level.

9. The process of Claim 1 wherein the catalyst is cobalt acetate tetrahydrate.

10. The process of Claim 1 wherein the said portion withdrawn from the gaseous phase of the reacto contains less than 4 weight percent oxygen and wherein the steady state concentration of acetaldehyde in the liquid-solid slurry phase is less than 500 p.p.m. by weight.

11. A continuous process for the liquid phase oxidation of p-xylene to terephthalic acid comprising
(a) continuously feeding p-xylene, acetaldehyde, air, acetic acid and a cobalt acetate tetrahydrate catalyst to a reactor having a gas phase and a liquid-solid slurry phase, the amount of air being sufficient to provide at least 4 moles oxygen per mole of p-xylene, the weight ratio of acetaldehyde to p-xylene being from about 0.25:1 to 0.60:1, the weight ratio of acetic acid to p-xylene being from about 5:1 to 10:1 and the amount of catalyst being sufficient to provide about 0.1 to 2.5% cobalt metal based on the combined weight of p-xylene, acetic acid and acetaldehyde,
(b) maintaining backmixing conditions in the liquid-solid slurry phase of said reactor, maintaining in said reactor a steady state concentration of aromatic terephthalic acid precursors of from about 0.3 to 1% by weight of the liquid-solid slurry phase present, a tempearture of from 125–135° C., a pressure of at least 400 p.s.i.g., and maintaining the average residence time of the reactants in the reactor such that at least 98.6% of the p-xylene fed is converted to some other product and
(c) continuously withdrawing from said reactor a portion of the liquid-solid slurry phase and a portion of the gaseous phase and recovering terephthalic acid from said portion withdrawn from said liquid-solid slurry phase.

12. The process of Claim 8 wherein the pressure in said reactor is from about 440 to 800 p.s.i.g.

13. The process of Claim 9 wherein the air is introduced into the reactor below the liquid level.

14. The process of Claim 13 wherein said portion of the gaseous phase withdrawn from the reactor contains less than about 4% by weight of oxygen and wherein the steady state concentration of acetaldehyde in the liquid-solid slurry phase of the reactor is less than about 500 p.p.m. by weight.

15. The process of Claim 1 wherein the feed to said reactor contains less than about 12% by weight of water based on the combined weight of the xylene, acetaldehyde, and acetic acid fed to the reactor.

16. The process of Claim 11 wherein the feed to said reactor contains less than about 12% by weight of water based on the combined weight of the xylene, acetaldehyde, and acetic acid fed to the reactor.

17. The process of Claim 11 wherein the air is introduced into the reactor below the liquid level.

References Cited
UNITED STATES PATENTS

| | | | |
|---|---|---|---|
| 3,240,803 | 3/1966 | Thompson et al. | 260—524 |
| 2,245,528 | 6/1941 | Loder | 260—524 |
| 3,700,731 | 10/1972 | Sullivan | 260—524 R |

LORRAINE A. WEINBERGER, Primary Examiner

R. D. KELLY, Assistant Examiner

PO-1050
(5/69)

UNITED STATES PATENT OFFICE
CERTIFICATE OF CORRECTION

Patent No. 3,850,981          Dated November 26, 1974

Inventor(s) John C. Trebellas, Hubert H. Thigpen, Wallace M. Mays

It is certified that error appears in the above-identified patent and that said Letters Patent are hereby corrected as shown below:

In column 3, line 15, for "generally" read -- general --.

In column 3, line 18, for "weights" read -- weight --.

In column 3, line 27, for "odrer" read -- order --.

In claim 10, second line thereof; for "reactd" read -- reactor --.

In claim 11, line 31 of column 7, for "tempearture" read -- temperature --.

Signed and sealed this 18th day of February 1975.

(SEAL)
Attest:

RUTH C. MASON
Attesting Officer

C. MARSHALL DANN
Commissioner of Patents
and Trademarks